United States Patent
Liljeberg et al.

(10) Patent No.: US 6,938,910 B2
(45) Date of Patent: Sep. 6, 2005

(54) TOWING CARRIAGE

(76) Inventors: Mattias Liljeberg, Vårbergsvägen 139, S-127 41 Skärholmen (SE); Michael Liljeberg, Vårbergsvägen 139, S-127 41 Skärholmen (SE)

( * ) Notice: Subject to any disclaimer, the term of this patent is extended or adjusted under 35 U.S.C. 154(b) by 0 days.

(21) Appl. No.: 10/275,307

(22) PCT Filed: May 2, 2001

(86) PCT No.: PCT/SE01/00938

§ 371 (c)(1), (2), (4) Date: Apr. 1, 2003

(87) PCT Pub. No.: WO01/83262

PCT Pub. Date: Nov. 8, 2001

(65) Prior Publication Data

US 2003/0160426 A1 Aug. 28, 2003

(30) Foreign Application Priority Data

May 2, 2000 (SE) .............................................. 0001605

(51) Int. Cl.⁷ .......................... B62K 27/12; B62D 13/04
(52) U.S. Cl. ...................... 280/204; 280/402; 280/444; 280/460.1
(58) Field of Search ................................ 280/402, 204, 280/414.5, 419, 442, 460.1, 459, 476.1, 656, 43.11, 43.2, 43.23, 446.1, 455.1, 443, 444, 43; 414/537, 56.3, 483

(56) References Cited

U.S. PATENT DOCUMENTS 1,613,945 A * 1/1927 Fox ............................ 280/204
2,701,069 A * 2/1955 Hawkins ...................... 414/563
3,197,230 A * 7/1965 Raimbault .................... 280/99
3,653,680 A * 4/1972 Denny .......................... 280/656
3,841,506 A * 10/1974 Smith .......................... 414/563
4,033,426 A * 7/1977 Williams ..................... 180/443
4,147,373 A   4/1979 Cully
4,759,563 A * 7/1988 Nash ........................ 280/476.1
5,006,032 A * 4/1991 Riedl et al. .................. 414/458
5,364,116 A * 11/1994 Houle et al. ................. 280/442
6,290,248 B1 * 9/2001 Yrigoyen .................. 280/476.1

FOREIGN PATENT DOCUMENTS

| DE | 693690  |   | 6/1940  |
|----|---------|---|---------|
| GB | 2189442 | * | 10/1987 |
| SE | 354611  |   | 3/1973  |

* cited by examiner

Primary Examiner—Anne Marie Boehler
(74) Attorney, Agent, or Firm—Ostrolenk, Faber, Gerb & Soffen, LLP

(57) ABSTRACT

The invention relates to a tow carriage, especially for towing motorcars with the aid of a motor-cycle (2) or some other small vehicle. The carriage (1) comprises at least two wheels (3, 4 and 5, 6) which supported are steerable by means of a steering device (22, 23) and via articulated pulling rods (7–10) can be coupled to preferably, the rear frame portion (11) of motor-cycle. On said pulling rods (7–10) there is, at each respective joint (16, 17), mounted an angle information transmitter (18, 19) which, when the rods (7, 9 and 8, 10) turn relatively each other in response to the motor-cycle (2) turning, actuate the steering device (22, 23) steering the wheels or, alternatively, said steering device (22, 23) being actuated by direction sensor mounted on the motor-cycle in order to detect a acceleration and turning/banking, the wheels (3, 4 and 5, 6) always assuming a correct steering angle as determined by the route of the motor-cycle (2).

6 Claims, 5 Drawing Sheets

TOWING CARRIAGE

BACKGROUND OF THE INVENTION

The present invention relates to a tow carriage for towing motorcars or a towed vehicle with the aid of a motor-cycle or some other small vehicle or towing vehicle.

Today special break-down lorries are usually used to tow vehicles which having been hit by a failure or for some other reason requires towing. These break-down lorries occupy much space on the road and often find it difficult to proceed, which can be troublesome, especially in a traffic jam. When a private passenger car has suffered engine failure in a traffic queue it is accordingly practically impossible for an ordinary break-down lorry to quickly reach the corresponding location and to perform a towing operation.

SUMMARY OF THE INVENTION

The object of the present invention is to use as a towing vehicle, a motor-cycle or some other small vehicle. In contrast to an ordinary break-down lorry, a motor-cycle can conveniently and rapidly reach the position of a car.

According to the invention use is made of a motor-cycle or towing vehicle and a tow carriage, the car being towed by the motor-cycle. The features characterising the invention are set out in the claims.

The invention provides a tow carriage for towing motorcars with the aid of a motor-cycle or some other small vehicle. The carriage satisfies the requirement in an excellent way and is at same time cheap-and easy to manufacture. The tow carriage solves traffic problems to which a traditional break-down lorries are exposed. The tow carriage can assume a transport position which is used when the motorcycle is on its way to the stationary car. In that context of a transport position, it is important that the transverse measurement of the carriage not be much greater than the measurement of the motor-cycle so that the ability of the vehicle combination to move in traffic is not reduced.

When in its use position, the tow carriage is arranged to make it possible for it to absorb the forces caused by the towed motorcar. In the use position, the parts of the tow carriage are mounted and the pulling rods used are extended to their full length. What both facilitates and makes possible use of a motor-cycle for the operation is that the structure of the carriage, and not the motor-cycle, absorbs all vertical forces generated when a motorcar is to be towed away. The only task of the motor-cycle is, with the aid of its engine, to move both the tow carriage and the motorcar placed thereon. The force absorption is attained because the carriage is provided with wheels of its own which are articulated. The pulling rods each include an articulated joint where an angle information transmitter is mounted. When the motor-cycle makes a turn, the pulling forces turn in relation to each other and to the angle then formed. The information transmitter feeds data to the steering devices used which then control the turn angles of the four wheels of the carriage. When a braking operation is carried out it is controlled from the motor-cycle and all wheels of the carriage are actuated and braked.

When it is in its transport state, the tow carriage is in a collapsed position-meaning that all of it can be gathered for transport on motor-cycle. The increase in width of the carriage is as marginal as possible. Also in that collapsed state the pulling rods used at the carriage are then in a telescoped position meaning that they do not substantially project in front of or behind the motor-cycle.

When the carriage is placed below the vehicle to be towed it is a significant advantages that the pulling rods can be turned and inserted laterally below i.e. the front wheels of the car to be towed.

BRIEF DESCRIPTION OF THE DRAWING

A preferred embodiment of the invention will now be described more in detail, with reference to the drawings.

DESCRIPTION OF A PREFERRED EMBODIMENT

Figure 1:
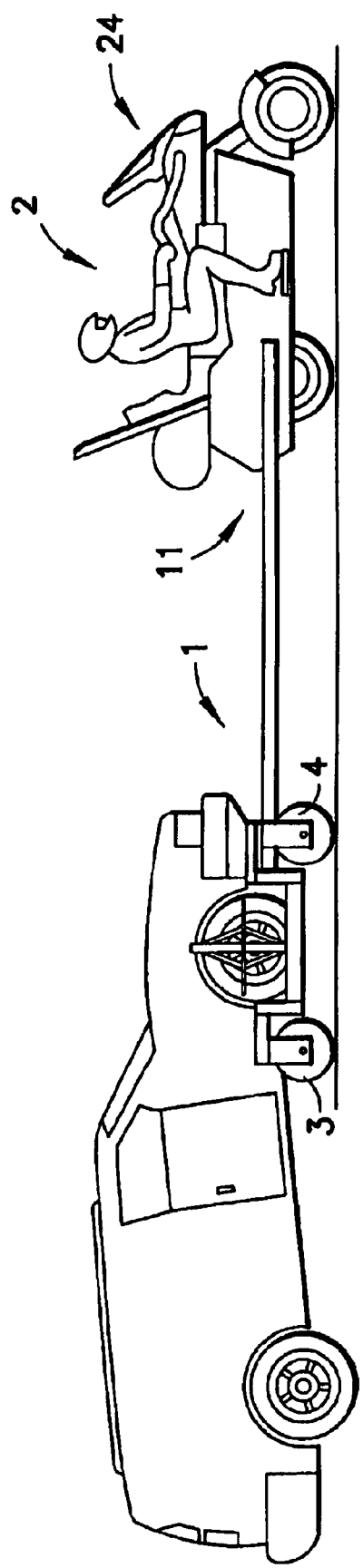
FIG. 1 is a lateral view illustrating a carriage according the invention which can be used for towing motor-cars with the aid of a motor-cycle.
Figure 2:
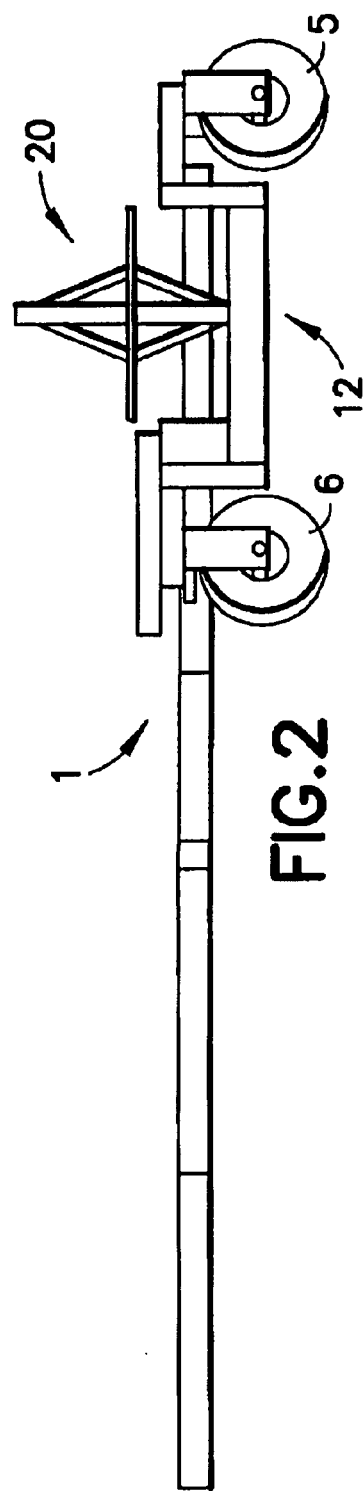
FIG. 2 illustrates the carriage in FIG. 1 in lateral view but without the motor-cycle.
Figure 3:
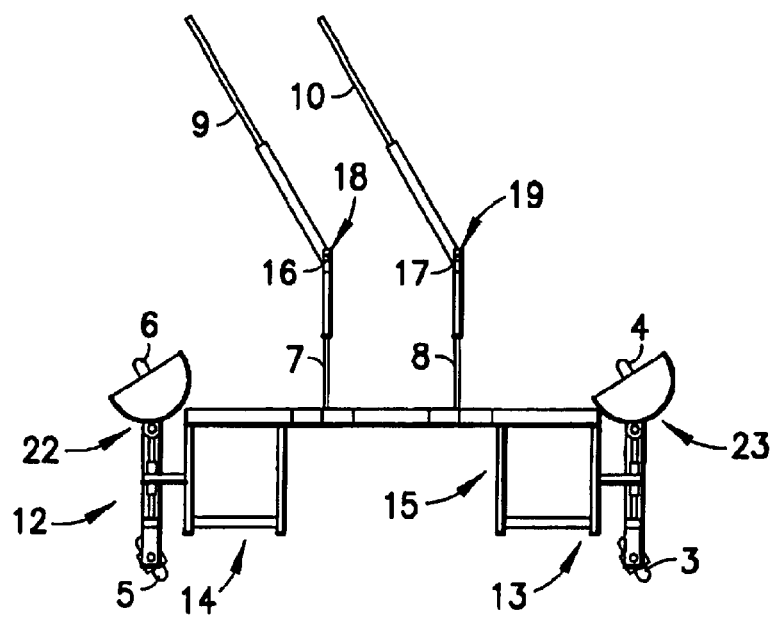
FIG. 3 is a top view of the carriage.
Figure 4:
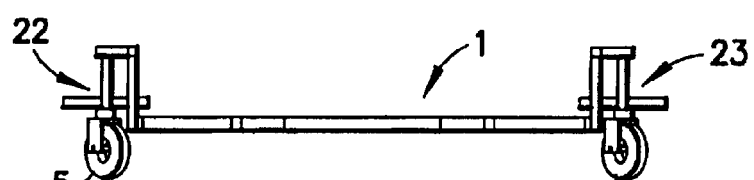
FIG. 4 is a rear view of the carriage.
Figure 5:
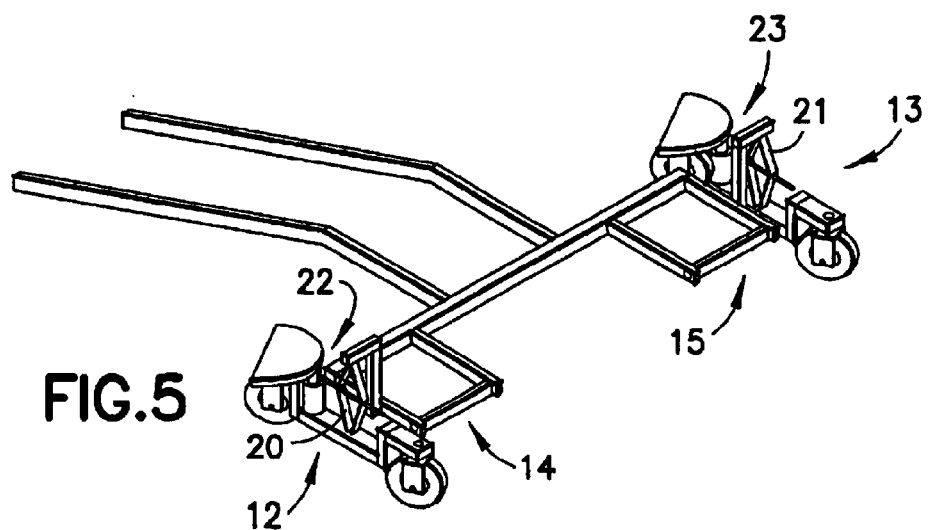
FIG. 5 is a perspective view illustrating the carriage as seen obliquely from above.
Figure 6:
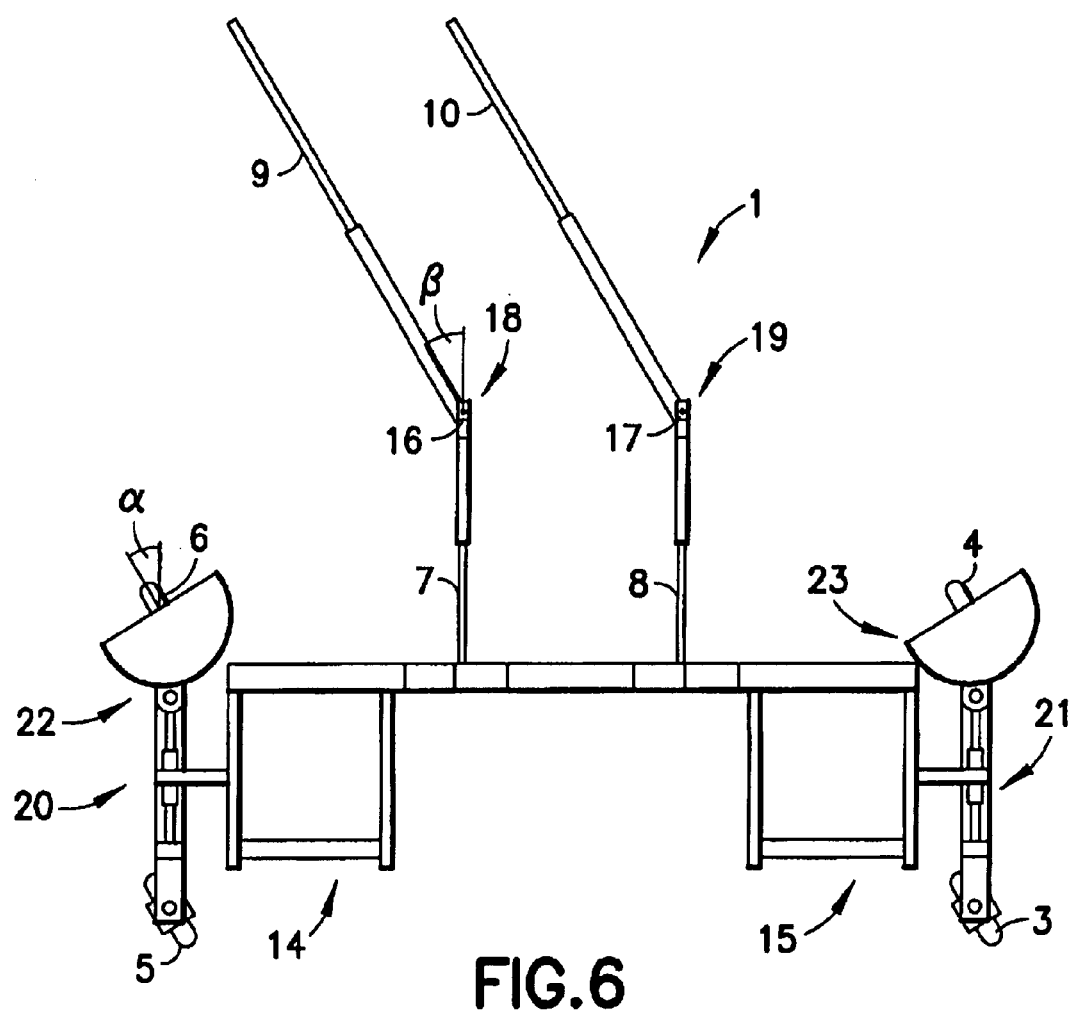
FIG. 6 is a view similar to that in FIG. 5 and more clearly illustrating the turning angle between the pulling rods and the wheels of the carriage.
Figure 7:
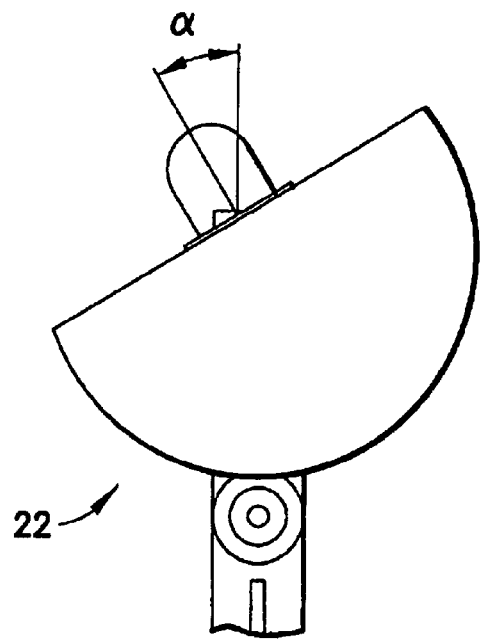
FIG. 7 shows on an enlarged scale show one of the wheel pairs used in the carriage and shown in FIG. 6.

The figures illustrate a preferred embodiment of the invention, a carriage 1 for towing motorcars with the aid of motor-cycle 2. The carriage 1 comprises at least two wheels although four wheels are shown 3–6 which support the carriage and all of the wheels can be steered with the aid of steering devices 22 and 23. Via articulated pulling rods 7–10 the carriage can be-coupled to the motor-cycle 2, and preferably its rear frame portion 11. With this carriage, all vertical forces generated during the towing with the aid of the motor-cycle will be absorbed by the carriage 1 instead of by the motor-cycle 2.

In the example illustrated the tow carriage comprises two wheel pairs 12, 13 both of which are pivoted. The pulling rods are secured to a transverse beam which at its outer portions include the respective wheel pairs 12, 13 and in those there are support means 14, 15 for the wheels of the motorcar. At each articulated joint 16, 17 disposed along the length of the pulling rods there is an a respective angle information transmitter 18, 19 which, when the rods 7, 9 and 8, 10, each turn along the lengths because the motor-cycle is turning, their steering devices 22, 23 control the steering of the wheels 3–6 to always assume a correct steering angle as determined by the route of the motor-cycle 2. As an alternative, the motor-cycle can be provided with a direction transmitter 24 for controlling the steering devices 22, 23 via a cable or via radio signals.

Further, each of the wheels of the carriage 1 can be braked individually without exerting any pressure against the motorcycle 2.

The carriage 1 also includes a lifting device 20, 21 at each wheel pair 12, 13 with the aid of which the vehicle to be towed can be lifted vertically.

Figure 8:
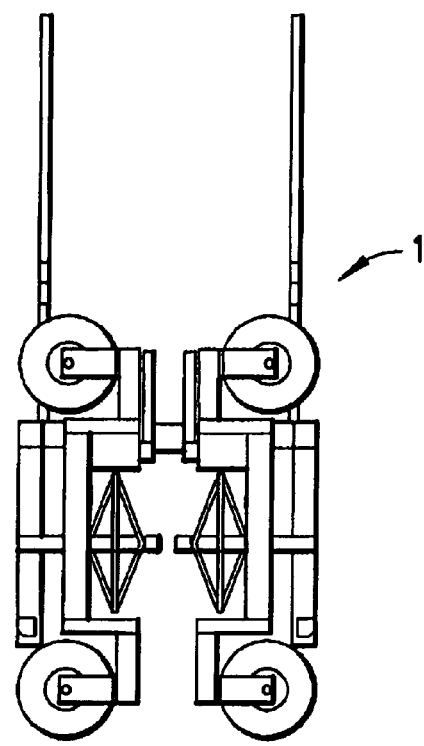
FIGS. 8–11 are four views showing the carriage in the collapsed transport state.
Figure 9:
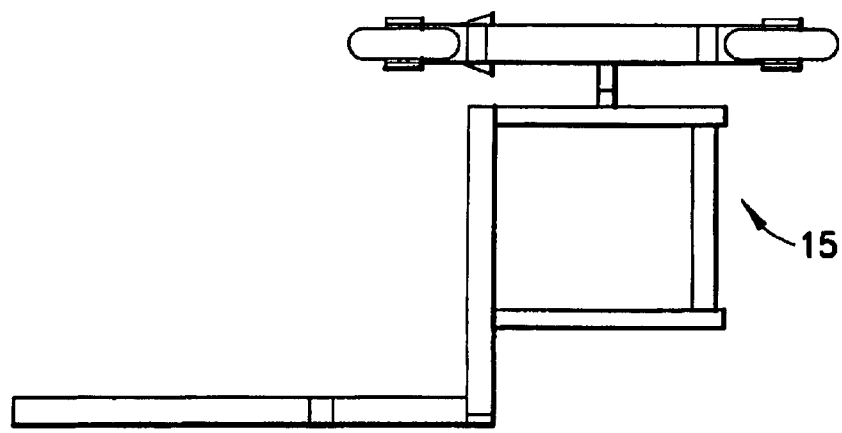
Figure 10:
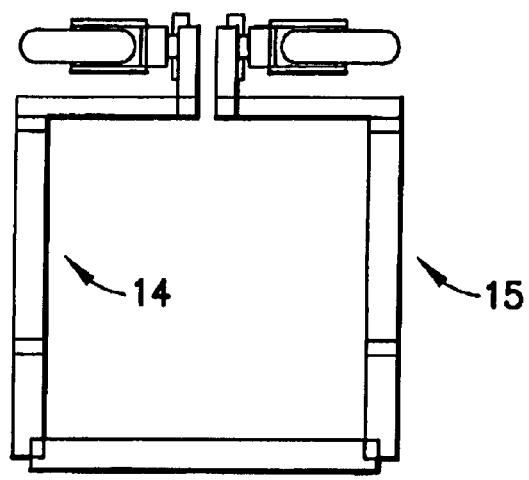
Figure 11:
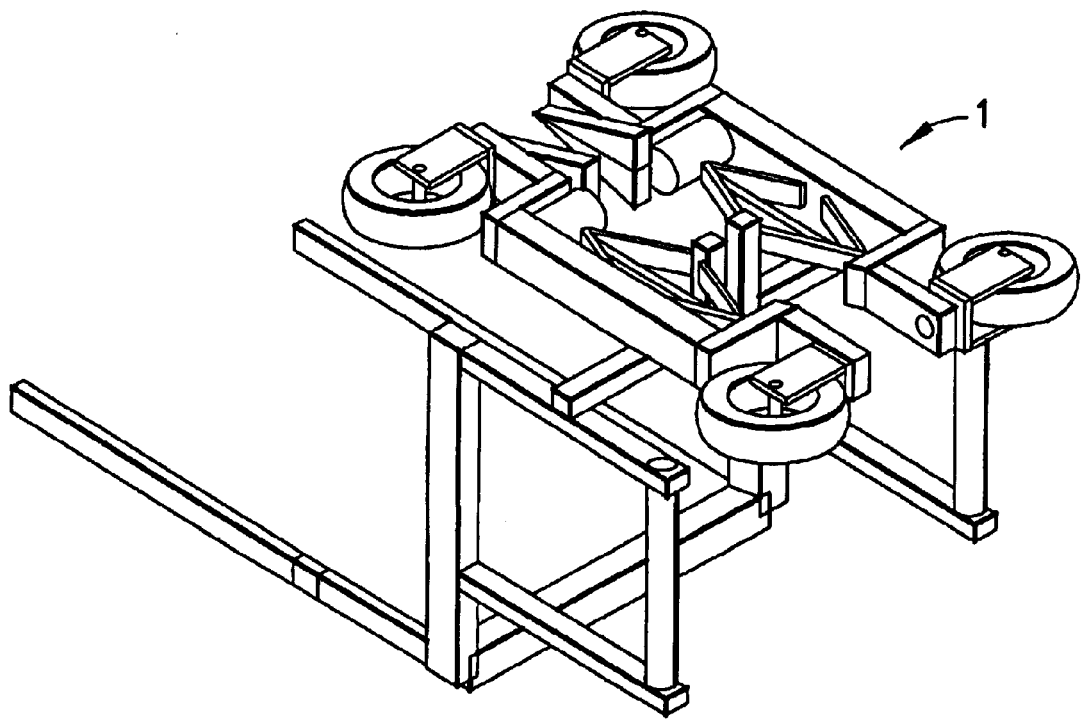

FIGS. 8–11 do more in detail illustrate the appearance of the carriage 1 after its collapse to the transport state, FIG. 8 being a top view, FIG. 9 a side view, FIG. 10 a rear view and FIG. 11 a perspective view. As seen in FIGS. 8, 10 and 11, the collapsed frame is slightly wider than the space between the rods 7 and 8, as noted above, so that the motor-cycle with the carriage attached may pass through traffic.

What is claimed is:

1. A tow carriage for towing a towed vehicle with the aid of another towing vehicle, the carriage comprising at least two wheels which support the carriage, a steering device for steering the wheels, the steering device comprising articulated pulling rods, each rod including an articulation joint along its length, a front portion of the rod at one side of the articulation joint and coupled to the towing vehicle and a rear portion of the rod at the other side of the articulation joint and coupled to the towed vehicle, an angle position transmitter at at least one of the joints, and communicating with the steering device, the front and rear portions of each of the rods turn relatively to each other in response to the towing vehicle turning, the angle position transmitter actuates the steering device and steers the wheels.

2. A tow carriage according to claim 1, wherein each wheel can be braked individually for avoiding exertion of any pressure against the towing vehicle.

3. A tow carriage according to claim 1, further comprising a lifting device for vertical lifting of the vehicle to be towed at the at least two wheels.

4. A tow carriage according to claim 1, further comprising; a direction sensor attached to the towing vehicle and operable to detect acceleration and turning of the towing vehicle for causing the wheels to assume a correct steering angle as determined by a route of the towing vehicle.

5. A tow carriage according to claim 4, wherein each wheel can be braked individually for avoiding exertion of any pressure against the towing vehicle.

6. A tow carriage according to claim 4, further comprising a lifting device for vertical lifting of the vehicle to be towed at the at least two wheels.

* * * * *